Dec. 1, 1970     A. G. BODINE     3,543,487
HARVESTER AND METHOD FOR HARVESTING UTILIZING SONIC ENERGY
Filed April 5, 1968     3 Sheets-Sheet 1
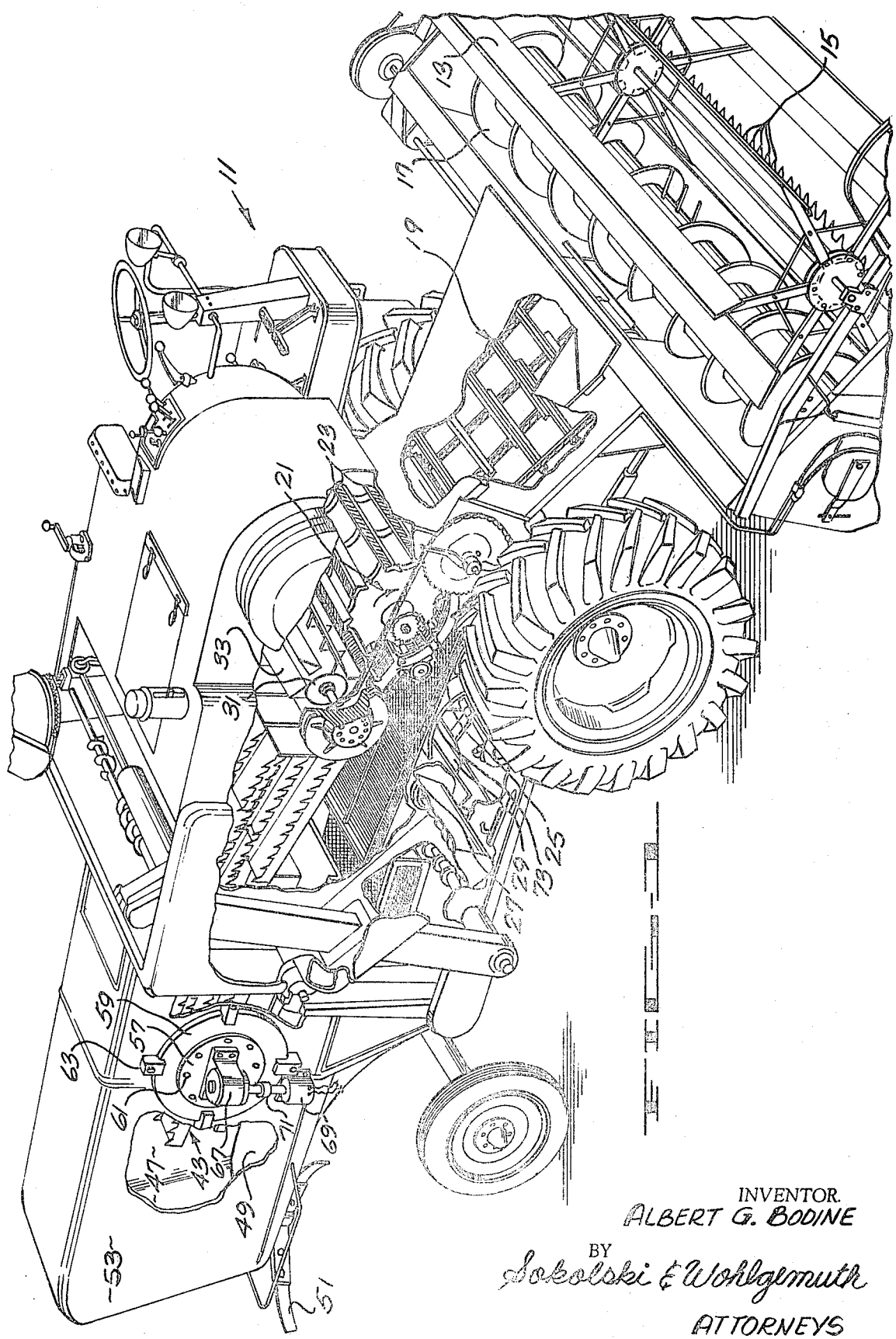
INVENTOR.
ALBERT G. BODINE
BY
Sokolski & Wohlgemuth
ATTORNEYS

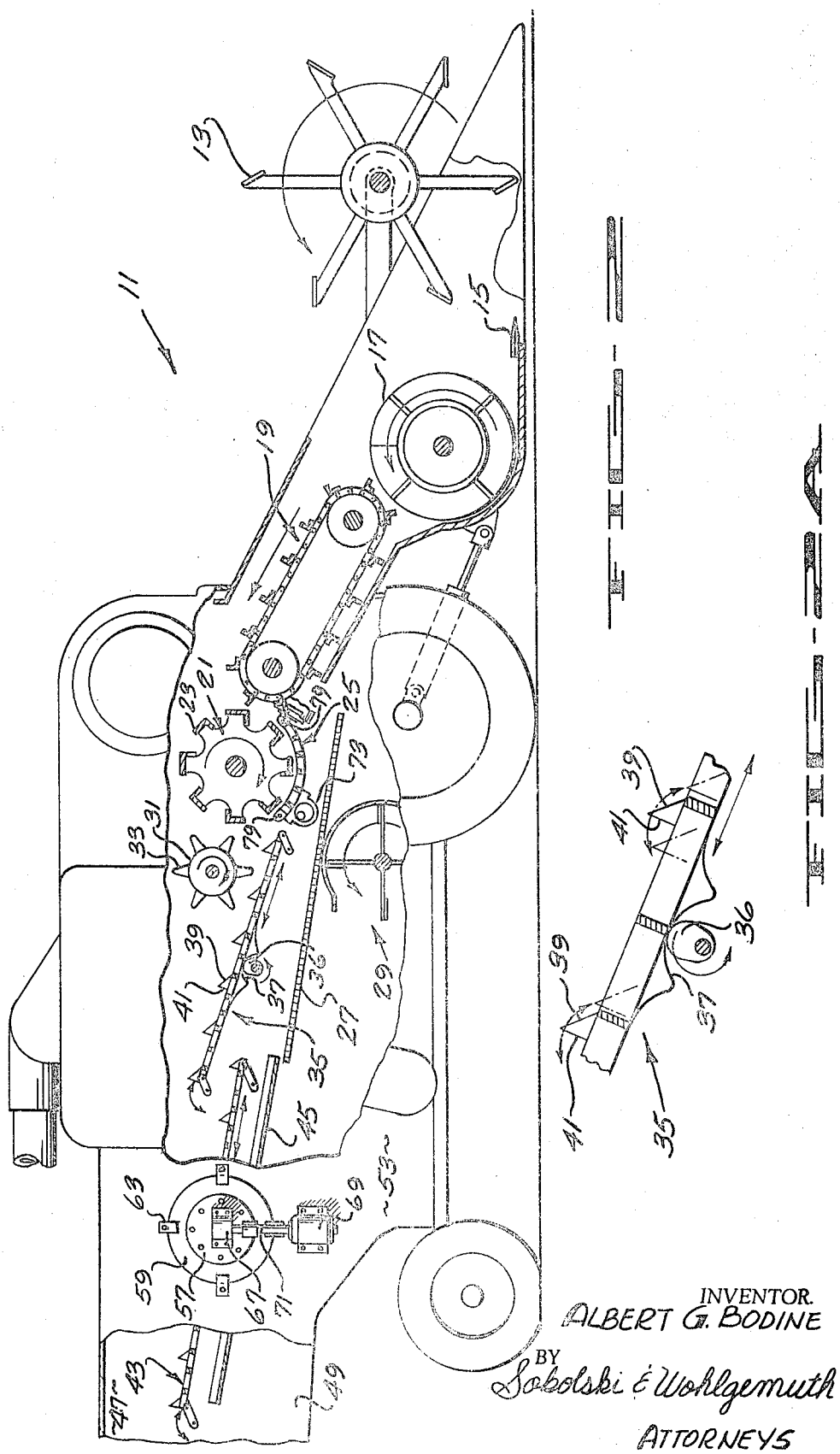

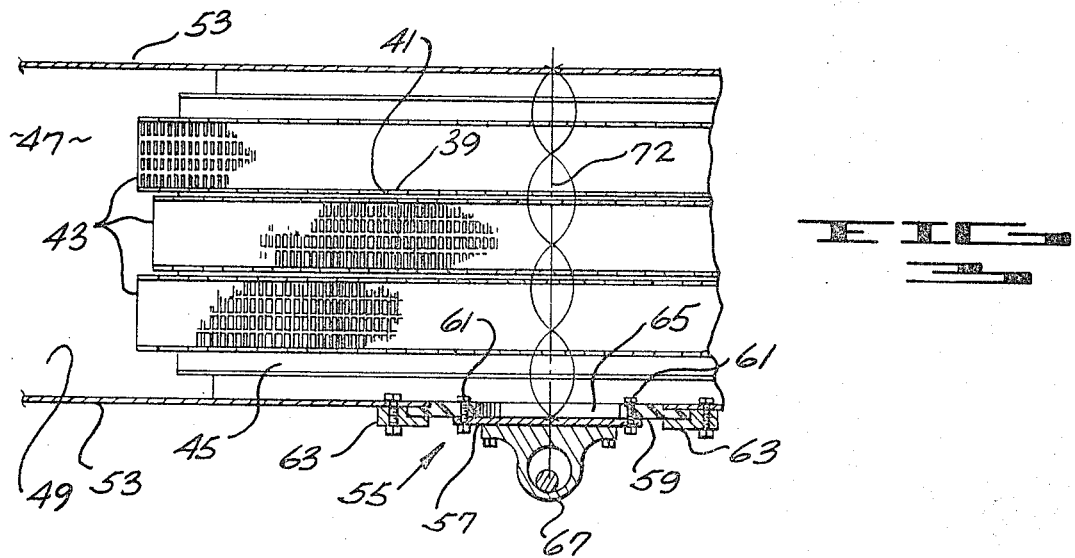
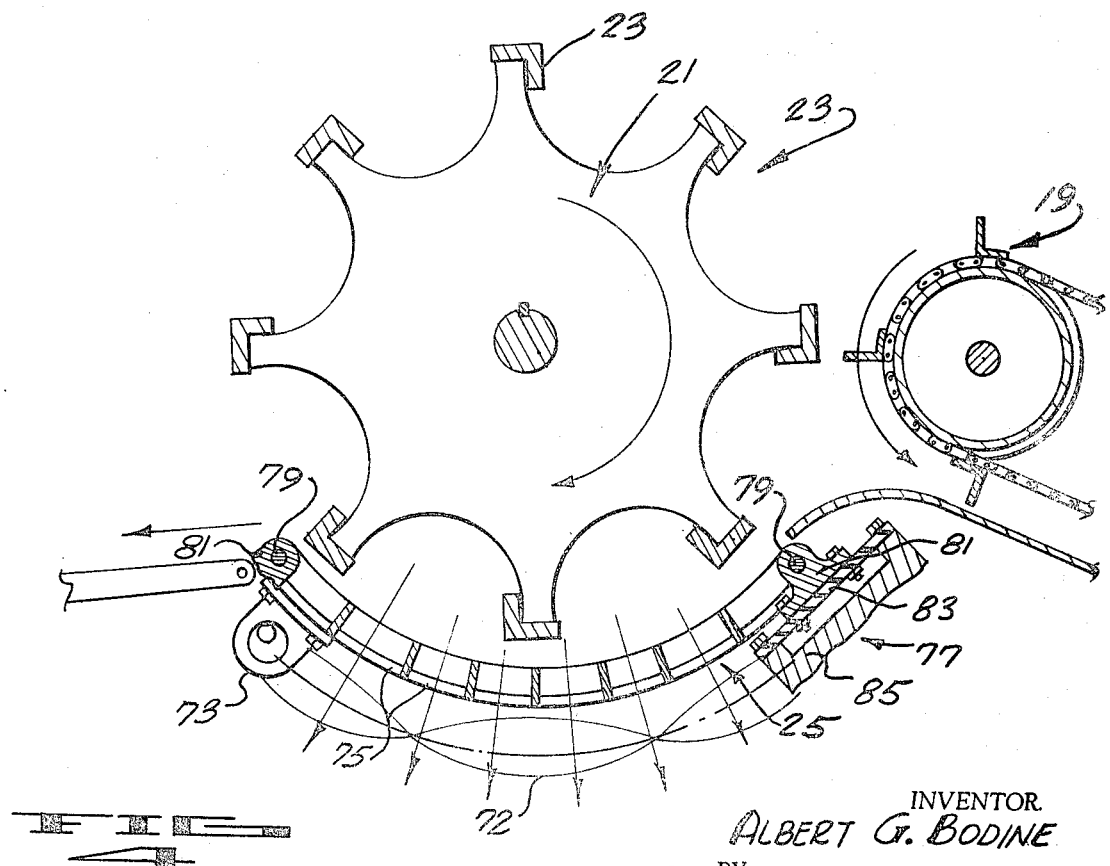

United States Patent Office 3,543,487
Patented Dec. 1, 1970

3,543,487
HARVESTER AND METHOD FOR HARVESTING UTILIZING SONIC ENERGY
Albert G. Bodine, 7877 Woodley Ave.,
Van Nuys, Calif. 91406
Filed Apr. 5, 1968, Ser. No. 719,168
Int. Cl. A01d 41/02
U.S. Cl. 56—21
8 Claims

ABSTRACT OF THE DISCLOSURE

A strong high-amplitude sound wave is generated in a conventional harvester to activate the straw passing therethrough with substantial vibratory amplitude to separate the seeds or the grain from the straw. Two separate means for generating the sonic energy can be utilized including a large diaphragm in the main cavity of the harvester and an orbiting-mass oscillator affixed to a concave element of the device where the seeds are initially separated from the straw.

---

During the process of harvesting grains much of the grain or seeds become trapped in the straw mass that is normally thrown away for reject from the harvester. This occurs even with the best design techniques of the prior art. Conventional harvesters utilize considerable vibration and a beating action designed to work the grain loose from the straw. The combination of the vibration and beating is sufficient to get a large percentage of the grain loose from the straw so it quickly drops before it becomes entangled in the straw mass which is carried on through the machine for reject. However, despite the best designs available, a certain percentage of the grain drops down and becomes trapped within the tangle of crossed straws comprising the straw mass. The trapped grain is thus carried through the machine along with the straw and rejected therefrom.

It is an object of this invention to provide a device and method for improving the operation of a harvester.

Another object of this invention is to provide a device and method for improving the separation of the grain from the straw acting in conjunction with the operation of a harvester.

The above and other objects of this invention are accomplished by subjecting the straw passing through the harvester or thresher to substantial sonic vibrations of relatively large-amplitude standing waves. This can be accomplished by affixing to the housing of the harvester which has a cavity therein, a vibratory diaphragm which may be driven by an orbiting-mass oscillator. The diaphragm will generate in the air surrounding the straw large-amplitude standing waves. The waves act upon the straw mass as it passes through the cavity of the harvester, causing the straw to vibrate at large amplitudes. This serves to loosen the entrapped grains from the straw mass allowing them to drop to the bottom of the harvester cavity and collect therein. Additionally, an orbiting-mass oscillator unit can be affixed to the open grate concave portion of the harvester where the seeds or grain are initially separated from the straw. At this portion of the device the additional vibration imparted to the concave element aids in even the initial separation of the seeds. It is believed that the invention will be better understood from the following description and drawings in which:

FIG. 1 is a perspective view of a conventional harvester incorporating the elements of this invention;

FIG. 2 is a partially sectioned schematic representation of the harvester of FIG. 1, disclosing the elements of the harvester most affected by the incorporation of this invention;

FIG. 2a is a detailed view of the means for actuating the straw walkers;

FIG. 3 is a sectional view of the straw walker elements of the harvester depicting the relationship of the vibratory element of the invention thereto; and FIG. 4 is an enlarged sectional view of the concave element of the harvester incorporating an orbiting-mass oscillator of this invention.

It has been found most helpful in analyzing the operation of the device of this invention to analogize the acoustically vibrating circuit involved to an equivalent electrical circuit. This sort of approach to analysis is well known to those skilled in the art and is described, for example, in chapter 3 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R, and mechanical impedance $Z_m$ is equated with electrical impedance $Z_e$.

Thus, it can be shown that if a member is elastically vibrated by means of an acoustical sinusoidal force $F_o \sin \omega t$ ($\omega$ being equal to $2\pi$ times the frequency of vibration), that $$Z_m = R_m + j\left(\omega M - \frac{1}{\omega C_m}\right) = \frac{F_o \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is most efficiently delivered to a load to which the resonant system may be coupled.

In the instant invention the straw and grain together have a low density and considerable surface area. Further, the combination of the grain and the straw is a structure having a low acoustic impedance. In other words, the straw is a material having a low inertia while possessing a large surface area to receive energy. In view of this it can be seen that the medium is very responsive to sound waves generated in a low-impedance medium such as air. A high-amplitude sound wave in air when brought in contact with the material will activate the straw with substantial vibratory ampliude. The straw having a much lower density than the grain will vibrate at a higher velocity or greater amplitude than the grain. The grain having a higher density will vibrate at a lower amplitude and velocity, separate from the straw. Thus the two vibrate at different amplitudes and different phase when subjected to the sonic energy. This will result in each particle of grain vibrating independently and each straw vibrating separately in a random nature.

More importantly, the multiple accelerations from a large-amplitude vibration tends to activate the straw so it becomes quite mobile and the intertwined pieces move relative to each other with substantial acceleration. There are acoustic reflections within the mass, which loosen things. This then dislodges the grain and seeds which have become trapped within the crossovers and crotches of the tangled mass of straw. The same wave in the air which acts upon the straw has much less acoustic coupling to the seeds because the seeds are small and have relatively higher density or mass as previously indicated. In other words the seeds are much less apt to receive vibratory energy from the vibrations in the air. Further, as indicated, the vibrations that the seeds do achieve will be of different phase and a much lesser amplitude or velocity than the straw because of the difference in mass and difference in acoustic coupling.

It is also important to note the significance of the attainment of high acoustical "Q" in the resonant system being driven, to increase the efficiency of the vibration thereof and to provide a maximum amount of energy for the activation of the straw and grain. As for an equivalent electrical circuit, the "Q" of an acoustically vibrating circuit is defined as the sharpness of resonance thereof and is indicative of the ratio of the energy stored in each vibration cycle to the energy used in each such cycle. "Q" is mathematically equated to the ratio between $\omega M$ and $R_m$. Thus, the effective "Q" of the vibrating circuit can be maximized to make for highly efficient, high-amplitude vibration by minimizing the effect of unnecessary friction in the circuit and/or maximizing the effect of mass in such circuit.

In considering the significance of the parameters described in connection with Equation 1, it should be kept in mind that the *total* effective resistance, mass, and compliance in the acoustically vibrating circuit are represented in the equation and that these parameters may be distributed throughout the system rather than being lumped in any one component or portion thereof.

It is also to be noted that an orbiting-mass oscillator may be utilized in the device of the invention that automatically adjusts its output frequency to maintain resonance with changes in the characteristics of the load. Thus, in the face of changes in the effective impedance presented by the load, the system automatically is maintained in optimum resonant operation by virtue of the "lock-in" characteristics of applicant's unique orbiting-mass oscillator. The orbiting-mass oscillator automatically changes not only its frequency but also its phase angle and therefore its power factor with changes in the resistive impedance load to assure optimum efficiency of operation at all times.

Turning now to FIG. 1, there is seen a conventional harvester or thresher 11. This is a standard conventional harvester and thus the minute details thereof will not be described, and only a brief description will be given of the major components effecting the separation of the grain from the straw. The thresher has a reel 13 which serves to direct the wheat to a cutter bar 15. An auger 17 directs the cut wheat to an elevator 19. The elevator 19 carries the wheat or such to a rotating cylinder 21 having a plurality of rasp bars or other stock engaging elements 23 providing propelling means about its outer periphery. The cylinder 21 rotates above an open grate concave element 25. This action serves to initially separate the grain from the straw with the grain falling through the open grate 25 to be collected on a main grain pan 27. The grain is cleaned on the screen by the action of a fan 29 situated thereunder. The straw is thrown from the rotating cylinder 21 to a second rotating element 31 having broad teeth 33 thereon. This second element serves to direct the straw on to a first plurality of straw walkers 35. Shown in this device, there are three such straw walkers 35 aligned side by side inclined upward from element 31. The straw walkers have openings therein so that the grain can drop through the pan 27 as the straw moves upward thereon.

The straw is forced upward on each walker 35 through oscillatory movement as shown in FIGS. 2 and 2a particularly. The straw walkers are pivotally connected at each end so that they can move backward and forward in accord with the arrow shown. When, as seen in FIG. 2a, cam 36, which is rotatably driven by suitable drive means (not shown), strikes the cam follower portion 37 of the straw walker, it causes the straw walker to move forward or in an upward direction. The straw will advance due to the upwardly sloped edges 39 of the teeth on the sides of the walkers. When the cam 36 disengages the follower portion 37, the weight of the walker 35 will cause it to fall backward to the position as shown in FIG. 2. However, the straw will not progress in a downward direction due to the vertical front edge 41 of the teeth. Thus, this is called a straw walker in that the straw tends to walk up the element and progress on to a next second plurality of straw walkers 43. The straw walkers 43 move in the same manner as the straw walkers 35. The grain falling from the straw on the walkers drops onto a slanted pan 45 which in turn directs it back on to the grain pan 27. As can be seen, the second set of straw walkers 43 are disposed within a large cavity 47 that has relatively few other elements therein. After the straw has progressed to the end of the straw walkers 43, it drops off the end, passes out through an aperture 49 in the bottom of the device and is dispersed by a spreader 51 which scatters the straw. Various other elements are shown such as the augers for collecting the grain and bringing it to the filling tanks of the device. These will not be described in detail since they form no part of the invention and are not affected by the principles to be described hereafter.

Mounted on the side of housing 53 which forms cavity 47 and in which the straw walkers 43 are located, is a large diaphragm member 55 seen in cross-section in FIG. 3 particularly. A circular thin metal diaphragm 57 is secured to a large concentric flexible rubber washer 59 by means of bolts 61. Four clamps 63 are utilized to secure the rubber washer together with thin flexible diaphragm 57 to the housing 53 about the aperture 65 formed therein. Mounted on flexible diaphragm 57 is an orbiting-mass oscillator 67 which may be of a construction such as shown and described in connection with FIG. 21 of my Pat. No. 2,960,314. The oscillator 67 is driven by a motor 69 through a shaft 71. The motor is appropriately mounted on housing 53. The motor 69 is shown as an hydraulic one driven by the hydraulic system of the harvester. However, the motor 69 can also be a pneumatic one driven by a pneumatic system of the harvester. The thin-walled metal diaphragm 57 together with the flexible rubber washer 59 is actuated by the orbiting-mass oscillator 67 at a sonic frequency such as to generate a large-amplitude standing wave 72 in the air across the cavity 47 affecting the straw moving up the straw walkers 43. This affords the previously described action causing the low-impedance straw to move at a relatively high amplitude allowing the grain to separate therefrom and fall through the open grate structure of the straw walkers 43 onto the grain pan 45.

A further feature of the invention pertains to the utilization of an orbiting-mass oscillator in connection with the concave element 25 where the grain is initially separated from the stock or straw. Referring now particularly to FIG. 4, an orbiting-mass oscillator 73 is affixed directly to the concave element 25 at one end thereof so as not to interfere with the passage of the grain therethrough. The oscillator can be of the same type used to actuate the diaphragm. It may be driven by a motor (not seen) in the same manner as shown with regard to the other oscillator. The oscillator is driven at a speed such as to impart resonant elastic sonic vibrations to the concave element 25 so that the straw passing over by the motion of the rasp 23 is subjected to considerable resonant type of vibratory force thereby aiding in the separation of the grain therefrom. This greatly facilitates the separation of the grain from the stock, and the passage of the grain through apertures 75 in the concave element. In order not to dissipate the vibratory energy to the entire machine, the concave element is supported by elastic mounts 77 at each end thereof. A pin 79 passes through each end of the concave element in order to support it. The pin engages mount 81 which is disposed on a flexible rubber mount 83 which in turn is secured to frame member 85. The mount for the end of the concave element near the oscillator is not shown in FIG. 4 so as to enable a better indication of the disposition of the oscillator on the device.

However, it can be understood that a similar acoustical mount 77, such as that just described, is also used on the end of the concave near the oscillator 73.

While the invention has been described and illustrated in detail, it is to be clearly understood that this is intended by way of illustration only and is not to be taken by way of limitation, the spirit and scope of the invention being limited only by the terms of the following claims.

I claim:

1. In a harvester for harvesting grain having means for cutting a crop and means for separating the grain from the stock, the improvement which comprises:
   sonic oscillator means affixed to said harvester for subjecting said stock and grain therein to resonant sonic vibration whereby grain held by said stock is separated therefrom, said oscillator operable at a resonant frequency of an elastic medium which is concurrently coupled to said oscillator and said crop.

2. The device of claim 1 wherein said means for subjecting said stock and gain to resonant sonic vibration comprises:
   an orbiting-mass oscillator.

3. The device of claim 2 wherein said means for subjecting said stock and grain to resonant sonic vibration further comprises a vibratory diaphragm mounted on said harvester, said oscillator being connected to said diaphragm to cause vibration thereof.

4. The device of claim 1 including an orbiting-mass oscillator driving an elastic resonant member arranged to transmit resonantly vibratory energy to the crop material.

5. In a harvester for harvesting grain having means for cutting a crop, a housing forming a cavity, means for initially separating the grain from the straw comprising a rotating member having stock-engaging elements about its periphery, a concave gate acting in cooperation with said rotating member, and additional means disposed in said cavity for advancing said straw from said rotating member through said harvester while continually further separating said grain from said straw,
   the improvement which comprises resonant vibration-transmitting means affixed to the housing of said harvester adjacent said cavity for generating resonant sonic vibrations therein to enhance the separation to the grain from the straw.

6. The device of claim 5 wherein said transmitting means is affixed to an orbiting-mass oscillator which actuates said diaphragm to cause said vibrations.

7. The device of claim 5 comprising the further improvement of orbiting-mass oscillator means coupled to said concave grate for generating resonant sonic vibrations thereof.

8. In a method for harvesting grain comprising the steps of cutting the crop and separating the grain from the straw, the improvement which comprises:
   subjecting said grain and straw to resonant sonic vibrations during the separation thereof to enhance the separating action.

References Cited

UNITED STATES PATENTS

| 2,528,275 | 10/1950 | Heth | 56—21 |
| 2,695,485 | 11/1954 | Krause | 56—21 |
| 3,076,547 | 2/1963 | Bodine | 209—1 XR |

ANTONIO F. GUIDA, Primary Examiner

U.S. Cl. X.R.

56—1; 130—25; 165—1; 209—111.9, 310